Patented Oct. 8, 1929

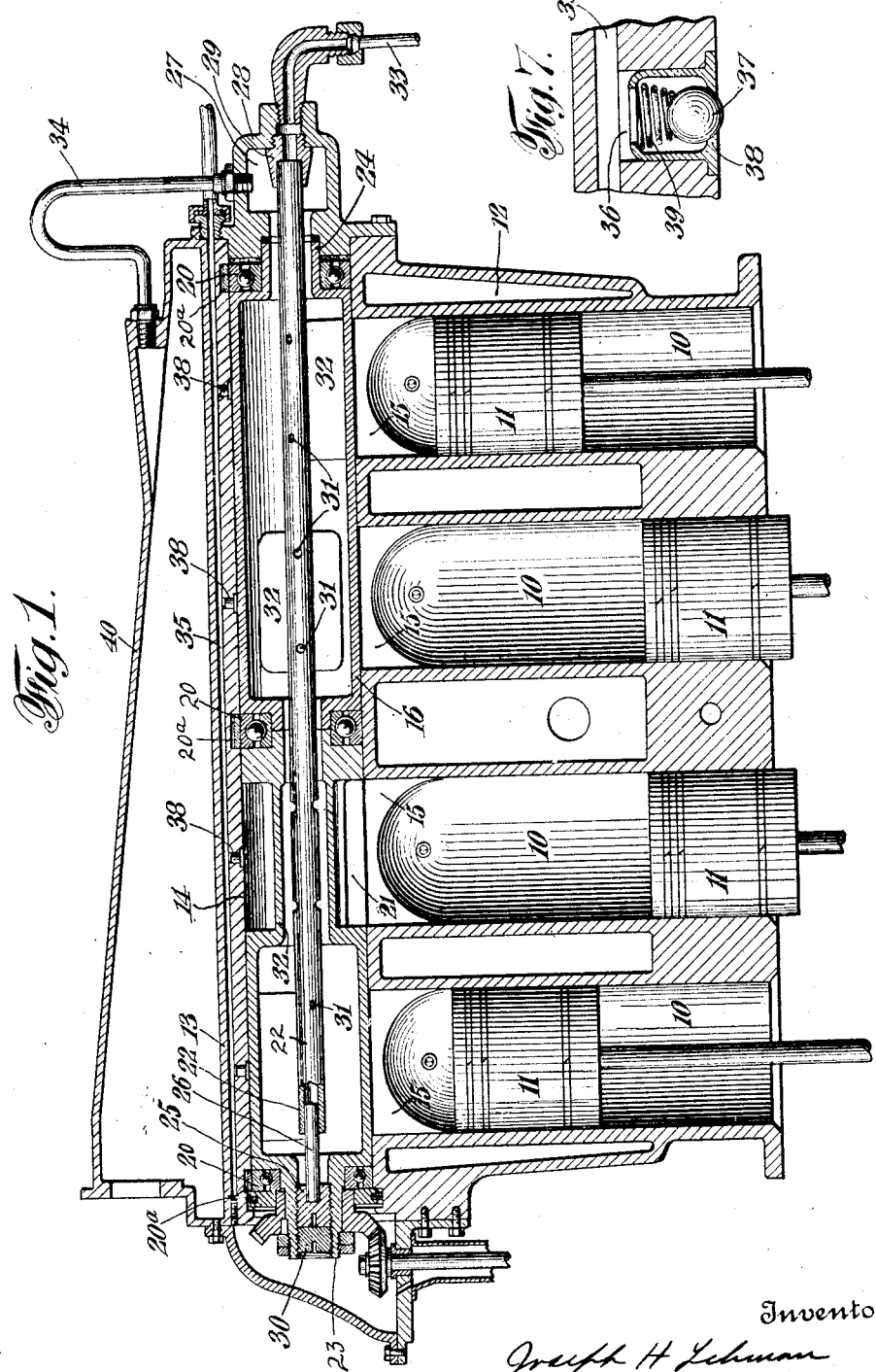

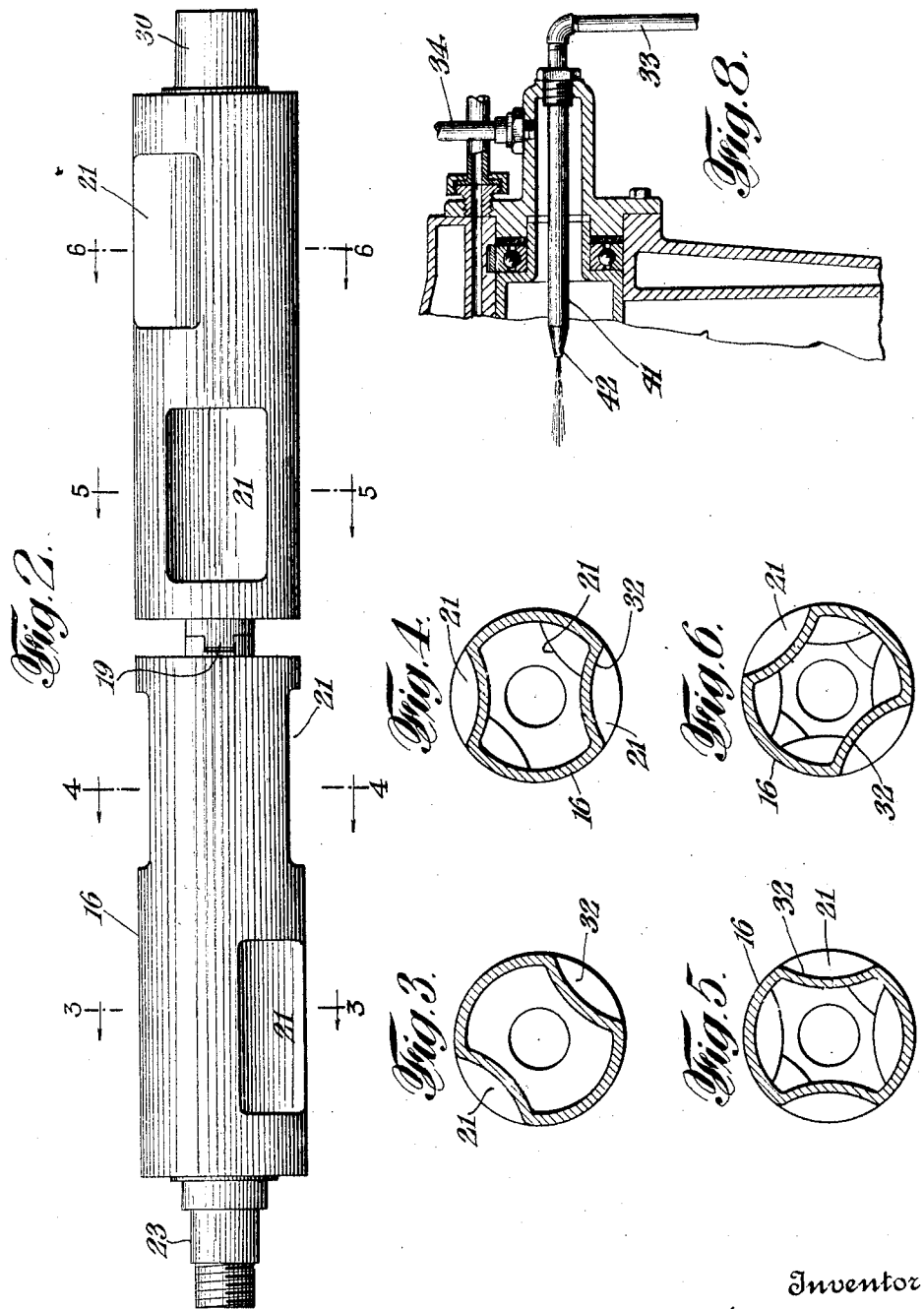

1,731,016

UNITED STATES PATENT OFFICE

JOSEPH H. LEHMAN, OF HASBROUCK HEIGHTS, NEW JERSEY, ASSIGNOR TO LEHMAN ROTARY VALVE CO., INC., OF NEW YORK, N. Y., A CORPORATION OF NEW YORK

ROTARY VALVE

Application filed December 11, 1926. Serial No. 154,091.

This invention is an improvement in rotary valves for internal combustion engines. Such valves where exposed to the high temperature of the exhaust gases of the engine, in order to operate efficiently, must be so constructed and mounted that they have a close running fit with the cylinder part, both when the engine is cold and when it is at the hottest running condition. This presents great difficulties due to the expansion and contraction of the parts caused by the temperature changes, the heating of different part to different temperatures, and the widely varying pressure in the cylinder during a cycle of operation.

By means of my invention I seek to overcome, at least in part, certain of these difficulties by limiting the temperature range of valve so that the dimensions of said valve will remain more nearly constant, and the temperature of the valve will be maintained more nearly the same as that of the valve casing.

I accomplish this by making the valve hollow and spraying water into the interior thereof. The water is vaporized by the heat of the valve walls, but by reason of the high latent heat of evaporation of water, a large amount of heat is abstracted from the walls. The water is delivered at least as fast as it evaporates so that the valve walls are prevented from rising to a temperature very much above the boiling point of the water.

A further difficulty which is encountered in the use of rotary valves for controlling the flow of the exhaust gases of an internal combustion engine, is in regard to lubrication. The entire surface contacting with the valve casing should be lubricated but if any considerable quantity of oil gets on the surface of the passage for the exhaust gas, it will be vaporized or partially burned and the engine will "smoke," that is, the exhaust gases issuing from the engine will contain the partially burned oil as smoke.

As a further feature of my invention, I provide controlling means for the oil delivery passages, whereby the supply of oil is shut off during that period in each revolution of the valve when the exhaust gas passage is in registry with the oil outlet.

Other features of my invention will be pointed out hereinafter or will be apparent from a consideration of the construction shown in the accompanying drawings. These drawings are to be considered in an illustrating rather than a limiting sense. In the drawings:

Fig. 1 is a central longitudinal section of a portion of an internal combustion engine embodying my invention;

Fig. 2 is a side view of the rotary valve;

Figs. 3, 4, 5 and 6 are transverse sections taken on lines 3—3, 4—4, 5—5 and 6—6 respectively of Fig. 2;

Fig. 7 is a fragmentary view of a section taken in the same plane as Fig. 1 and illustrating on an enlarged scale a detail of my improved oiling system; and Fig. 8 is a longitudinal section of a portion of an engine showing an alternative form of water delivery means.

In the drawings I have shown my invention as applied to a four-cylinder, four-cycle internal combustion engine, having a valve constructed and mounted substantially as described and claimed in my prior application Ser. No. 39,638, filed June 25, 1926. The details illustrated except as to the cooling and lubricating features form no portion of my present invention. The engine is shown as having cylinders 10, pistons 11 and a water jacket 12. In the cylinder head 13, there is provided a valve chamber 14 connected to each cylinder by a port 15 which may be a slot extending diametrically across the cylinder and parallel to the axis of the valve chamber.

Fitted to rotate in the valve chamber 14 is a valve 16 which is substantially in the form of a hollow cylinder. It is illustrated as comprising two sections arranged end to end and supported by means of ball bearings 20 at each end and in the middle. Each ball bearing is held down by a strap 20ª.

The valve is of a type which controls both the inlet and exhaust of gas through the single cylinder port, but so far as my present invention is concerned this is not essential. There might be separate valves, one for the inlet and the other for the exhaust. My invention is particularly advantageous where the valve controls, or is subjected to the action of the hot exhaust gases. Neither the construction of the gas passages in the valve nor the number are any feature of the present invention. As shown, the valve has its surface formed with a pair of diametrically opposed by-pass recesses 21 for each cylinder port 15. As a shaft is rotated by suitable four-to-one gearing, each recess will connect the port 15 alternately with an inlet port and an exhaust port (not shown). The pairs of recesses are angularly spaced for successive cylinders so as to effect the opening and closing of the ports 15 in the proper order of firing. The angular spacing of the by-passes is shown in Fig. 2 and in cross sections Figs. 3 to 6.

Within the hollow valve is a water spray pipe 22 for the cooling water. This may be supported in various ways. As shown the valve has at its ends hollow stems or extensions 23 and 24. The extension 23 is internally threaded to receive a screw plug 25 which carries a pin 26 which in turn enters and carries one end of a tube 22 centrally located in the valve 16. The opposite end of the tube 22 passes through the stem 24 and into a chamber 27 formed in a casting 28 which forms the end of the valve chamber. The tube is seated in a nipple 29 mounted in the outer wall of the chamber 27. By turning the screw plug 25 the pipe 22 may be adjusted to bear snugly in its seat in the nipple 29. This adjustment may be locked by a second screw plug 30. The pipe 22 may be held stationary or may turn with the valve 16. Preferably it is held stationary and secured to the nipple 29, while the pin 26 which closes the end of the pipe, turns the plug 25. However, I may have the pipe turn with the valve and in the nipple 29 by making it fast to the pin 26 and plug 25.

The pipe 22 is provided with perforations 31 which are preferably located in such position as to face the inner walls 32 of the by-pass recesses 21. A water supply pipe 33 connects with the nipple 29 so that water may be introduced into the pipe 22 and sprayed through the ports 31 against the walls 32. Leading from the chamber 27 is an outlet pipe 34 which connects to a steam condenser.

Immediately above the valve chamber 14 the top wall is longitudinally bored to provide an oil channel 35. Leading from this channel into the valve chamber at the points in line with the by-passes 21 are ports 36 provided with the valves. These valves in the form shown in detail in Fig. 7 consist in each case of a ball 37 seated in an opening in a holder 38 and pressed against the seat by means of a spring 39. The holder 38 may be forced into the port 36 to fit friction-tight or may be secured in place by any suitable means.

In operation the valve 16 is rotated in the usual manner to control the ports 15, and at the same time, water is forced through the pipe 33 and sprayed out of the ports 31 against the wall of the valve, preferably at the recesses 21, so as to keep the walls of these recesses from overheating. As the water strikes the hot wall it is vaporized into steam which passes out through the pipe 34.

If the jacket be kept filled with water which is circulated through a water cooler, the upper portion 40 of the jacket may serve as the steam condenser, in which case the pipe 34 has a bend above the high water level in the jacket. This bend prevents the return flow of water from the jacket to the valve particularly when the engine is not running. The engine may be cooled without the circulation of water as a liquid, for instance by the Rushmore system. That is, the water may be permitted to boil in the jacket and only steam delivered from the upper part 40 to a separate steam condenser, from which the condensate is returned to the jacket. In such case the steam from the pipe 34 may join the other steam in the jacket part 40 or may be conducted directly to the condenser.

The water delivered to the pipe 33 may come from any suitable source, for instance the pump which circulates water between the jacket and the cooler, or the pump which returns condensate from the condenser to the jacket. With a stationary engine this water may come from any separate or independent source.

Instead of having the pipe 22 extend the full length of the valve with holes along its length, it may extend only part way and terminate in a spray nozzle directed axially or in any other direction. I have shown such a construction in Fig. 8. The pipe 41 here illustrated terminates at a point a short distance within the valve and has a terminal nozzle 42. There may be two of these pipes 41, one extending in each end of the valve. For lubricating, oil is delivered through a passage 35 and ports 36. The cylindrical surface of the valve 16 lifts the balls 37, permitting a very slight amount of oil to flow out of the channel 35 upon the valve. However, it is not desirable to introduce oil into the by-passes 21, because such oil would be heated by the exhaust gases and make smoke. When a by-pass recess 21 reaches a ball 37, the ball moves inward under pressure of springs 46, to close the oil passage. As the far side of the recess reaches the ball it raises the latter and lets the oil flow again. By this means I provide for oiling the cylindrical portion of the valve 16, but interrupt the oil whenever a by-pass recess comes into line with the oiling valve. The oil spreads along the cylindrical surface to effectively lubricate all parts thereof. If desired separate lubrication for the ball-bearings may be provided.

Having thus described my invention, what I claim is:

1. In an internal combustion engine, a hollow rotary valve for controlling the exhaust gases, and means for introducing a relatively fine stream of cooling liquid into the interior of the valve to be vaporized therein by the heat of the valve.

2. In an internal combustion engine, a hollow rotary valve and means for spraying a cooling liquid into the interior of the valve.

3. In combination, a hollow rotary valve and means for directing a plurality of sprays of cooling liquid against the inner surface of the wall thereof.

4. In combination, a valve casing formed with ports, a hollow valve mounted to rotate in the casing and formed with recesses adapted to control said ports, and means for spraying cooling liquid into the interior of the valve against such recessed portions of the valve.

5. In combination, a valve casing formed with ports, a hollow valve mounted to rotate in the casing and formed with recesses to control said ports, a pipe leading into the valve and formed with perforations facing said recessed portions of the valve, and means for delivering water to the pipe.

6. In a water-jacketed internal combustion engine, a valve casing, a hollow valve rotatable in the casing and adapted to control the exhaust gases of the engine, means for introducing water into the valve in such quantities as to be flashed into steam by the heat imparted to the valve by the exhaust gases, and means for discharging the steam from the valve.

7. In a water-jacketed internal combustion engine, a valve casing, a hollow valve rotatable in the casing and adapted to control the exhaust of the engine, means for spraying the interior of the valve with water in such quantities that the spray will be flashed into steam by the heat imparted to the valve by the exhaust of the engine, and steam outlet means connecting the valve with the water-jacket of the engine.

8. In a water-cooled internal combustion engine, a valve casing, a hollow valve rotatable in the casing, means for drawing water from the cooling system of the engine and spraying it against heated portions of the interior of the valve whereby the spray will be vaporized, and means for conveying the vapor back into the cooling system of the engine.

9. The method of cooling a rotary valve of an internal combustion engine, which consists in introducing water in a fine stream into the valve, whereby the water will be vaporized by contact with the valve, and the valve will be cooled by the latent heat of vaporization.

10. The method of cooling a rotary valve of a water-cooled internal combustion engine, which consists in introducing a fine stream of water into the valve whereby the water will be turned into steam by the heat of the valve and the heat will be absorbed as latent heat in the steam, and condensing the steam in the cooling system of the engine.

11. The method of cooling a rotary valve of a water-cooled internal combustion engine, which consists in taking water from one part of the cooling system, spraying the valve therewith at such a rate that the spray will flash into steam on contacting with the valve, and discharging the steam into another part of the cooling system of the engine.

Signed at New York, in the county of New York and State of New York, this 10th day of December, A. D. 1926.

JOSEPH H. LEHMAN.